United States Patent [19]

Rutten et al.

[11] Patent Number: 5,773,732
[45] Date of Patent: Jun. 30, 1998

[54] MEASURING INSTRUMENT AND ASSEMBLING METHOD

[75] Inventors: Gerard Rutten, Murten; Walter Hofmann, Sutz, both of Switzerland

[73] Assignee: Synton A.G., Lyss, Switzerland

[21] Appl. No.: 635,791

[22] Filed: Apr. 22, 1996

Related U.S. Application Data

[63] Continuation of Ser. No. 264,326, Jun. 23, 1994, abandoned.

[30] Foreign Application Priority Data

Jul. 9, 1993 [CH] Switzerland ............... 02 074/93-1

[51] Int. Cl.[6] .................................................. G01D 7/00
[52] U.S. Cl. ............................................................ 73/866.1
[58] Field of Search .................................. 73/866.1, 729, 73/432.1

[56] References Cited

U.S. PATENT DOCUMENTS

| 1,802,278 | 4/1931 | Schlaich | 73/866.1 |
| 1,891,134 | 12/1932 | Barthel | 73/866.1 |
| 3,807,350 | 4/1974 | Powell | 73/866.1 |
| 3,867,841 | 2/1975 | Widlund | 73/866.1 |
| 3,874,242 | 4/1975 | Csaposs et al. | 73/866.1 |
| 3,943,781 | 3/1976 | Jurovsky . | |
| 3,945,258 | 3/1976 | Nakaya | 73/866.1 |
| 4,077,257 | 3/1978 | Leeman . | |
| 4,718,278 | 1/1988 | Bergsma | 73/866.1 |
| 5,533,414 | 7/1996 | Huang | 73/866.1 |

FOREIGN PATENT DOCUMENTS

| 2233679 | 1/1975 | France . |
| 2343998 | 10/1977 | France . |
| 8813899 | 12/1988 | Germany . |

OTHER PUBLICATIONS

EP Search Report CH207493 and Translation.

*Primary Examiner*—Hezron E. Williams
*Assistant Examiner*—Nashmiya Fayyaz
*Attorney, Agent, or Firm*—Foley & Lardner

[57] ABSTRACT

The transmission mechanism of the instrument is lodged in two fabricate bridges. Axles are journalled with one end in a one-piece bearing spring, allowing a simple, play free and low-friction bearing and a simple assembling. The bridges are connected together by means of positioning elements and snapped together in elastic holding tongues and held in the desired position. One of the axles can be axially adjusted by means of its bearing screw and thanks to its journalling in the bearing spring, in order to adjust the transmission ratio of the transmission mechanism. The bearing screw of the axle can be adjusted radially too by means of a screw and a flexible tongue in order to adjust the zero position of the tracer contacting the membrane, or to make a zero point correction.

2 Claims, 2 Drawing Sheets

MEASURING INSTRUMENT AND ASSEMBLING METHOD

This application is a continuation-in-part of application Ser. No. 08/264.326 filed Jun. 23, 1994, now abandoned.

BACKGROUND OF THE INVENTION

The present invention belongs to the field of mechanics and is generally related to measuring instruments. More particularly, the invention is related to a measuring instrument comprising a measuring element and an instrument framework, a mechanism being lodged within said framework for transmitting a position of said measuring element to a display element, said framework consisting of shaped pieces which are connected to each other at least in part by elastic forces.

Mechanical measuring instruments of this kind are used for different purposes, such as pressure measuring instruments comprising a pressure pickup cell, length measuring instruments, hygrometers, dynamometers and capillary thermometers. The manufacture of such measuring instruments has been rather expensive until now, as a result of the number of necessary parts for the mechanism effecting the transfer from the measuring element to the display element as well as to the costs of assembly which is generally by hand in view of the limited volume of manufacture. The transfer mechanism of known measuring instruments generally comprises flat plates or bridges which are maintained and screw fastened in the necessary relative position and distance to each other. Further auxiliary elements such as bearings must be manufactured and mounted as separate parts which situation results the relatively high number of pieces and the costly manufacture as already mentioned. If special adjusting procedures are required, additional parts or certain adjusting procedures must be provided, which are expensive and require special skill, as will be shown by way of an example.

Simplified framework constructions have already been suggested. Thus, German Utility Model No. DE-U-88 13 899 is related to a frame construction for a dial face indicator such as a speed indicator wherein the frame comprises hooks received in slots on a cover plate. However, this construction connects only two elements of the framework.

Therefore, it is an object of the present invention to drastically rationalize the manufacture of a measuring instrument of the above depicted kind by reducing the number of parts required and by substantially simplifying the assembling.

SUMMARY OF THE INVENTION

The object of the invention is attained by providing a measuring instrument wherein the shaped pieces are bridges which are elastically snapped or latched into holding devices of a base plate or a housing. In particular, the base plate may comprise elastic webs which connect mounting sites of the base plate with the remaining portions of the base plate and thus avoid distorsions during the mounting of the base plate.

A rational assemblage is thus possible by the construction of framework pieces of the measuring instrument as shaped parts, preferably as fabricated parts, and these this parts can be assembled in a particularly simple manner. For the rest, these parts may take over different functions thus avoiding special parts hitherto necessary. Through the connection of parts by elastic forces, especially by elastic snapping of framework bridges into holding devices of a base plate or of a housing, the assembling can he drastically simplified. Screwed connections can be fully eliminated or, if a safety screw would anyway be present, this safety screw can additionally serve other purposes as it will be explained later.

The manufacture of framework pieces of the fabricated unit as shaped parts, especially as fabricate parts, and their mutual connection to each other and to a base plate or a housing of the measuring instrument by interlocking orientation means and elastic pressure leads to relatively low precision of the mutual position of the different mechanical parts. It is therefore desired to provide particularly simple and polyvalent equilibrating and adjustment possibilities. According to one embodiment of the invention, the bottom of the housing which encloses a pressure cell is embossed in such a manner that the bottom has a greater distance to the cell in the center than at the periphery. As already mentioned, these measures are in connection with the above listed characteristics allowing a rational assembling but they have also an independent importance whether the instrument may be constructed to comprise a measuring element and an instrument framework, a mechanism being lodged within said framework for transmitting a position of said measuring element to a display element, said framework consisting of shaped pieces which are connected to each other at least in part by elastic forces, characterized in that said shaped pieces are bridges which are elastically snapped or latched into holding devices of a base plate or a housing and in that said elastic forces are elastically holding the bridges; and assembled in that said base plate comprises mounting sites, elastic webs, and remaining parts distinct from said mounting sites and said elastic webs, wherein said elastic webs connect the mounting sites of said base plate with the remaining parts of said base plate or not. In other words: The features of claim 3 and further measures described below for a simple and effective adjustment of the mechanics and for equilibrating the instrument may also be used with otherwise constructed instruments.

The invention and its special advantages will now be explained further by means of an example shown in the drawing.

DETAILED DESCRIPTION OF THE INVENTION

The pressure gauge shown has a lower part or base in the form of a fabricated part 1 which forms the bottom of a pressure pickup cell having a membrane 2.

A connecting sleeve 3 is tightly connected to the base 1. The base 1 has three cams, one of which is shown at 4 contacted by the edge of the membrane 2 and serving to center the membrane on the base 1. The membrane edge is sealingly fastened to the base 1 by soldering, welding or cementing. In the region of the pressure cell, the base 1 is shaped in such a manner that its outermost edge is nearer to the membrane than its center. This achieves a desired stiffening of the base so that it can be made of a relatively thin material. Furthermore, this ensures the membrane against excessive distortion in the case of a vacuum which could damage the membrane, in that the edge of the membrane is supported by the base after a relative small deformation and only the central portion of the membrane may be further deformed. Furthermore, the pressure cell has a small volume.

Figure 1:
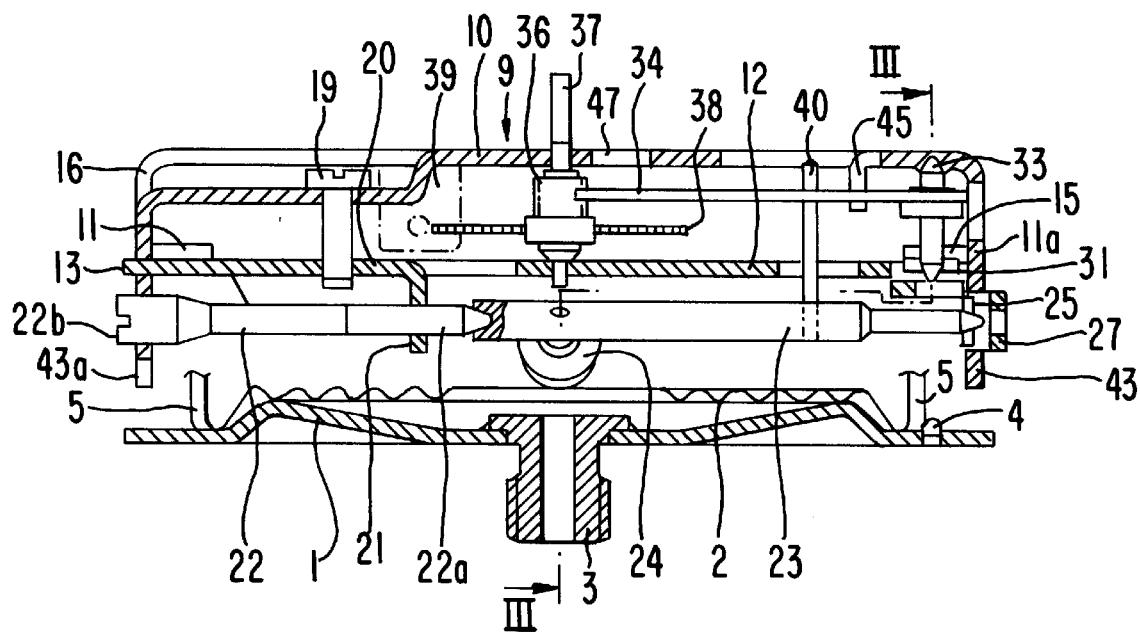
FIG. 1 shows a cross-sectional view of the measuring instrument which is a pressure gauge.

The base 1 has four upward bent tongues 5 which are shown in FIG. 1 only in part. As shown particularly in FIG. 3 and 4, these elastic tongues 5 comprise at their upper, slightly inward bent end a retaining tooth having an upper inclined flank 6 and a lower inclined flank 7. A shoulder 8 is provided below the flank 7. The tongues 5 serve to elastically retain two bridges of the measuring unit. The first of these bridges comprises an upper, substantially flat yoke 10 and two rectangularly downward projecting legs 11, 11a. The second, lower bridge 12 is essentially flat shaped and has a tongue 13 which protrudes substantially without any lateral play into a window of the leg 11 and is therefore held, after assemblage, in a well defined position. The bridge 12 has pushed-out cams 14 at the other end which protrude into a hole or slot of internally bent tabs 15 at this some end of the leg 11a, thus defining the mutual position of the bridges 10 and 12 after assembling. Tabs 16 corresponding to the tabs 15 are also provided at the other end of the bridge. Notches 17 are disposed at the sides of the bridge 12. One of the flanks of these notches coincide with corresponding flanks of the tabs 15 and 16. The flanks 7 of the tongues 5 sit elastically close to the flanks of the tabs 15 and 16 in the assembled state and hold the bridges together in their mutual position, the vertical position being, by the way, clearly defined by the bearing of the lower bridge 12 on the shoulders 8 of the tongues 5. The bridges 10 and 12 are thus connected to each other and to the base 1 of the instrument in a definite position by interlocking position means and by the elastic forces of the holding tongues 5. In the ready assembled state, the bridges are further connected by a sole screw 19. This screw 19 acts upon a freely cut and thus elastically deformable tongue 20 of the lower bridge 12. A bearing pin 22 whose point protrudes into a recess of a rotably journalled axle 23, is screwed into a bent-down flange 21 of the tongue 20. The thread 22a of the pin 22 is a self-cutting thread and has been formed without any clearance and without producing. The enlarged end 22b of the pin 22 having a screwdriver slot is slightly clamped in the assembled state between two webs of the leg 11 of bridge 9 and thus secured against unwanted rotation.

Figure 5:
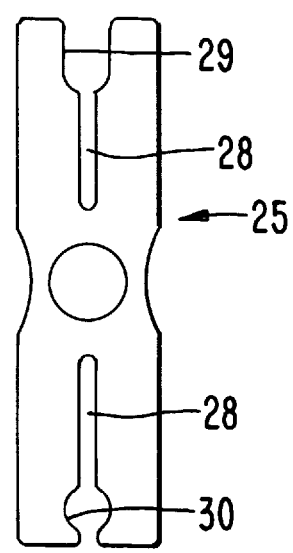
FIG. 5 shows a spring bearing.

A tracer 24 having a spherical head, bearing on the flat central portion of the membrane 2 and which transmits the movement or the position, respectively, of the membrane to an axle 23, is connected to this axle. The other end of the axle 23 has a point which protrudes into a recess of a bearing spring 25 which is held in a predetermined position at the pushed-out cams 26, only one of which being shown in FIG. 3. The bearing spring 25 can more or less be bent within a bent-out part 27 of the leg 11a, the part 27 limiting the flexion of the bearing spring 25 so that the axle cannot jump out of its bearings when violent shocks act on the instrument. The bearing spring 25 is shown in FIG. 5 at a greater scale. It has at both ends relatively deep slots 28, thus shaping the spring ends as elastically spreadable forks. At one of these ends, the slot 28 has an enlarged slot portion 29 so that the bearing spring is able to move somewhat in the lengthwise direction of the spring when the spring is more or less bent. At the other end, the slot 28 has a circular enlargement 30 in which a holding cam 26 can be inserted free from any play. In this way, the cam secures the spring in a definite position. The diameter of the holding cams is slightly greater than that of the enlarged location 30 or the width of the enlarged portion 29, thus enabling the bearing spring to be attached to the cams during assembling and is than self-retaining. A corresponding bearing spring 31 is disposed by means of corresponding holding cams 26a above a downward bent web 32 of the lower bridge. It serves for bearing the lower point of an axle 33 whose upper point is journalled in a bearing cone crimped into the upper bridge 10. The bearing of the axle 33 between a rigid bearing and a flexible one is also selected in such a manner that the axle cannot jump out of the bearings either by severe shocks or by occasional touches or manipulations of the swivel arm 34. The axle 33 comprises a swivel arm 34 having a toothed segment 35 meshing with a pinion 36 of a pointer axle 37. The pointer and the affiliated dial are not shown. A spiral spring 38 whose outer end is fastened by means of a pin 38a to a downward bent tab 39 of the bridge 10 acts on the pointer axle which is journalled in the bridges 10 and 12. A pin 40 inserted into the axle 23 and which protrudes through a window 41 of the lower bridge 12 acts on the swivel arm 34. Above it, the upper bridge 10 has a greater window 42 giving view to the swivel arm for a purpose which will be explained later. The helical spring 38 exerts a counterclockwise torque on the pointer axle so that a clockwise torque is exerted on the toothed segment 35 and on the swivel arm 34. Thus, the swivel arm 34 presses on the pin 40 which pushes the tracer 24 against the membrane 2 through the axle 23. The transmission elements of the mechanics of the measuring instrument thus mesh without play so that the movement or the position, respectively, of the membrane is precisely transmitted to the pointer axle and the pointer.

Figure 3:
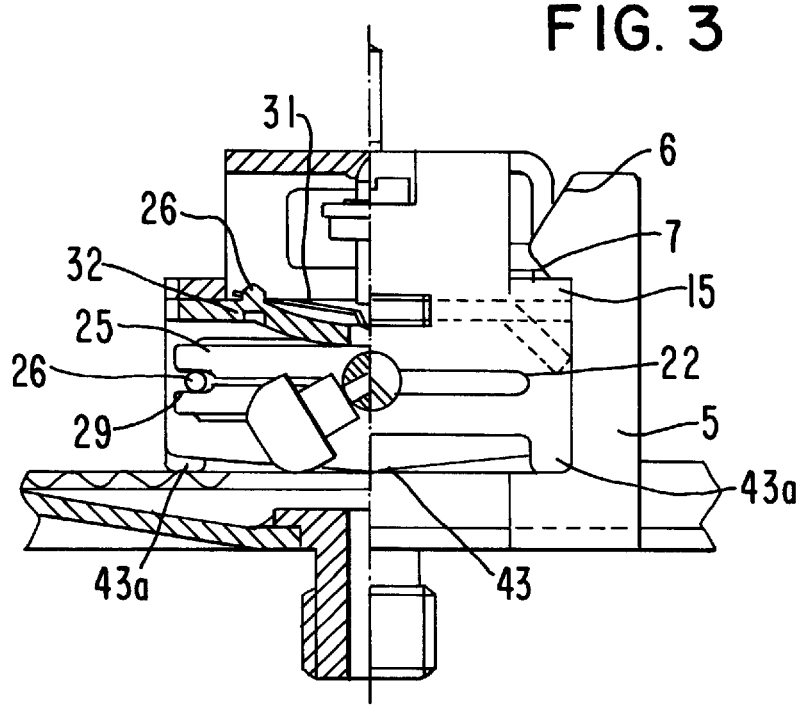
FIG. 3 shows a partial section along the line III—III of FIG. 1, partially in frontal view.
Figure 4:
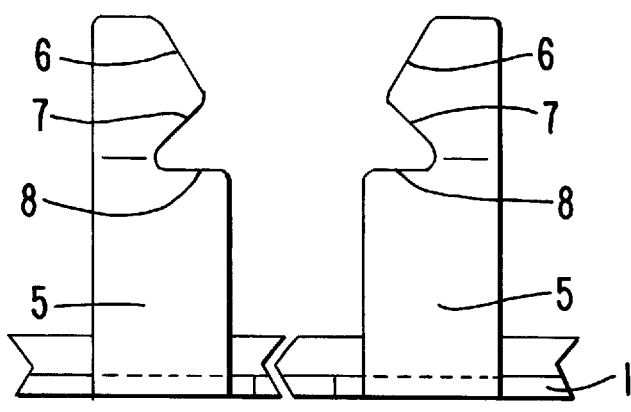
FIG. 4 shows a partial view of the instrument base.

It can be seen in FIG. 1 and 3 that the lower end of the leg 11 is constructed so as to have two lateral seating points 43a, and the lower end of leg 11a has one central seating point 43. These three seating points are situated exactly in the plane of the flat central portion of the membrane 2. This makes it possible to put the pre-assembled framework before the mounting into the holding tongues 5 in a definite three-point position on a flat test base and to effect a pre-adjusting in the line of the adjustment still to be described.

Figure 2:
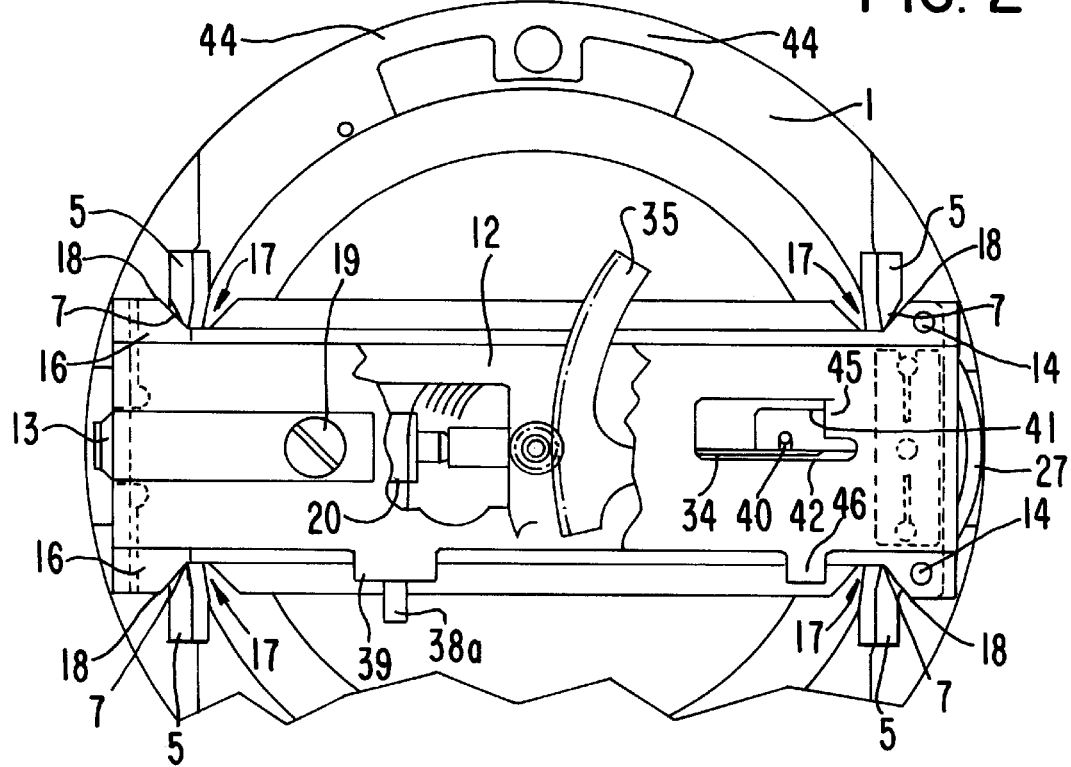
FIG. 2 shows a view of the measuring instrument.

It is shown in FIG. 2 that the base plate comprises punched-out windows, one of them being shown, which form elastic webs 44 at both sides of an enlarged portion comprising a mounting hole or an open slot. Corresponding webs are provided at diametrically opposed locations or at several locations. Thus, the base plate 1 and the whole mechanism can elastically be suspended and thus protected against distortions during mounting into a housing.

The swivelling motion of the swivel arm 34 or its toothed work 35, respectively, can be limited by stops which present the teeth from coming out of meshing contact with the pinion 36. Such stops 45 and 46 are indicated in FIG. 1 and 2.

A hole 47 in the upper bridge provides for inspection of the underneath lying parts, particularly of the toothwork 35.

For the assembling of the shown instrument, the bearing springs 25 and 31 are inserted, as mentioned above, into the bridges 10 or 12, respectively, and they are held by themselves. Afterwards, the pointer axle 37 and the axle 33 of the swivel arm 34 and of the toothed segment 35 are inserted, and the two bridges are put together. At that point, the screw 19 may be inserted and somewhat tightened in order to keep the two bridges definitely together. The axle 23 is now inserted in setting the point of the axle 23 into the bearing spring 25, and the pin 22 is screwed into the flange 21 where it cuts its own thread and is therefore held without play. The friction of the thread and, additionally, the previously mentioned friction at the enlarged end 22b will secure the pin 22 against accidental rotation and thus axial displacement. Finally, the combined bridges 10 and 12 are snapped into the holding tongues 5. In doing this, the holding tongues are expanded along the flanks 6 whereupon the bridges snap into the described position and are held in the shown position between the flanks 7 and the shoulders 8.

The bearing of both axles 23 and 33 between a rigid bearing part and an elastic bearing spring allows a journalling without play and under a definite bearing pressure defined by the bearing spring; this achieves a safe but low friction bearing. Furthermore, this bearing excludes any jamming of axle 23.

The elastic bearing of the axle 23 has an additional significances. The axle can be axially displaced by rotating the pin 22. The pin 40 is axially displaced also within a certain range, and its contacting point with the swivel arm 34 and thus the transmission ratio on the pointer axle and the pointer (not shown) is modified. It is therefore possible to adjust this transmission ratio in a simple and safe manner by means of adjusting automatics, in contrast to the conventional practice where the pin 40 must be bent into the correct position. The screw 19 which acts on the tongue 20 of the bridge 12 can be used to adjust this tongue and thus the end of the pin 22 which contacts the axle 23 vertically. Therefore, a zero correction becomes possible in the sense that the bearing position of the tracer 24 on the membrane 2 can exactly be determined. This adjustment may be verified by means of the swivel arm 34 and the window 42; when the adjustment is correct, the swivel arm should he exactly parallel to the lower window edge. The zero position of the pointer is achieved by correcting the pointer position on its axle or by positioning of the dial.

It has already been pointed out that the shown instrument is composed of particularly simple and only few parts which can be manufactured at low cost. This is especially true for the one-piece bearing springs 25 and 31 which can be constructed without special bearing bodies, for example jewel bearings. The bearing mentioned above, having no play and only little friction, brings about a further improvement of the linearity of the definition and a reduction in hysteresis.

The instrument shown is mounted after assembling into a housing and completed by a dial and a pointer. It is also possible to snap the combined bridges 10 and 12 together with the inserted transmission mechanism parts into a housing provided with appropriate elastic supporting elements. Instead of fabricated parts, geometrically stable parts made of synthetic materials, e.g. glass fiber reinforced plastic parts, or injection moulded parts may be used at least in part. Instead of the sphere-like tracer 24, a curved finger could be employed.

We claim:

1. A measuring instrument comprising a measuring element and an instrument framework, a mechanism being lodged within said framework for transmitting a position of said measuring element to a display element, said framework consisting of shaped pieces which are connected to each other at least in part by elastic forces wherein said shaped pieces comprise bridges which are elastically snapped or latched into a single, common base, said elastic forces elastically holding and assembling the bridges;

a rotatable transmission axle whose rotational movement is transmitted by a radial pin, one end of said axle being journalled within an axially resilient bearing and another end of said axle being journalled in an axially adjustable bearing, the axially adjustable bearing being lodged within a radially resilient and adjustable tongue of a first one of said bridges, wherein a locking screw acts between a second one of said bridges and the adjustable tongue of the first one of said bridges simultaneously fastens said bridges.

2. A measuring instrument comprising:

a measuring element and an instrument framework, a mechanism being lodged within said framework for transmitting a position of said measuring element to a display element, said framework consisting of shaped pieces which are connected to each other at least in part by elastic forces;

wherein said shaped pieces comprise bridges which are elastically snapped or latched into a single, common base, said elastic forces elastically holding and assembling the bridges, and one of said bridges having an elastically deformable tongue; and wherein the bridges are connected together by a sole screw exerting a screwing force, onto said tongue, an axle of said mechanism being supported in said tongue, whereby said measuring instrument is calibrated by adjusting said sole screw, and thereby said tongue and axle, respectively, by elastic deformation of said tongue according to the screwing force.

* * * * *